April 22, 1969  C. R. MOLENAAR  3,440,580

ELECTRICAL PROTECTIVE DEVICE

Filed June 19, 1967  Sheet 1 of 2

INVENTOR
CHARLES R. MOLENAAR
BY Robert N. Casey
ATTORNEY

April 22, 1969   C. R. MOLENAAR   3,440,580
ELECTRICAL PROTECTIVE DEVICE
Filed June 19, 1967   Sheet 2 of 2

INVENTOR
CHARLES R. MOLENAAR
BY Robert A. Casey
ATTORNEY

United States Patent Office 3,440,580
Patented Apr. 22, 1969

3,440,580
ELECTRICAL PROTECTIVE DEVICE
Charles Richard Molenaar, Saginaw, Mich., assignor to General Electric Company, a corporation of New York
Filed June 19, 1967, Ser. No. 646,985
Int. Cl. H01h 75/12
U.S. Cl. 335—18                              6 Claims

ABSTRACT OF THE DISCLOSURE

A unitary circuit breaker of the molded case type includes within the casing means sensitive to ground faults, means sensitive to overcurrents and means sensitive to short circuit currents, all of which act on a common trip latch of the breaker to cause automatic opening. The overcurrent sensitive means comprises thermal current-responsive means. The short-circuit sensitive means comprises magnetic current responsive means. The ground fault sensitive means comprises a current unbalance detecting coil which energizes a tripping solenoid, releasing a normally latched plunger to cause tripping.

BACKGROUND OF THE INVENTION

Field of the invention

The present invention relates to electric circuit breakers, i.e., manually and automatically operable switching devices including means for causing automatic opening in response to predetermined electrical conditions.

Description of the prior art

Electric circuit breakers commonly comprise a housing and include manually operable mechanism in the housing for operating contacts therein at will between open and closed circuit positions. In addition, current responsive means is commonly included for causing automatic opening of the contacts upon the occurrence of certain predetermined current conditions through the circuit breaker. This current responsive means includes means for protecting the circuit against "overcurrent" conditions wherein the magnitude of the current through the breaker is roughly from 125% to 300% of the nominal rating of the breaker, and against "short circuit" conditions, wherein the currents are in excess of 300% of the nominal rating. Such prior art circuit breakers do not, however, afford protection against "ground" faults unless they draw current in the ranges covered by the aforementioned overcurrent and short circuit protecting sensing means. Ground faults sometimes occur, however, which draw currents of values less than 125% of the nominal current rating of the circuit breaker. Such ground faults are not detected by prior art circuit breakers, and can cause serious damage to property or hazard to personnel.

It is an object of the present invention therefore, to provide a novel, unitary circuit breaker which is capable of providing ground fault protection as well as overcurrent and short circuit protection.

It is another object of the invention to provide a unitary circuit breaker including means for protecting against all the major types of electrical abnormalities, including ground faults, which shall at the time be no larger than and only slightly more expensive than prior art circuit breakers not including ground fault protection.

It is also desirable that circuit breakers furthest from the source of energy in a distribution system trip in response to a fault lying beyond them before those closer to the source in order that as small a portion of the system as necessary be disconnected in isolating a fault.

Accordingly, it is a further object of this invention to provide a circuit breaker of the type described wherein the opening of other breakers in the system closer to the energy source is prevented.

Summary of the invention

In accordance with the invention, the foregoing objects and other advantages are achieved by the provision of a unitary automatic circuit breaker which includes within a single casing a circuit breaker trip means capable of actuation by means responsive to ground faults as well as by means responsive to overcurrent and short circuit conditions. Ground fault currents are detected by a zero-sequence or differential type transformer mounted within the circuit breaker housing between the conventional trip unit and the contacts. The transformer secondary is connected to a current coil which acts on the same breaker trip means which is acted on by the overload and short circuit protecting means. To avoid unnecessary or undesired tripping, the ground fault responsive means is provided with time delay means and also with means for opening a local switch to disconnect the sensing circuits or similar breakers located closer to the system source of energy.

The invention will be more fully understood from the following detailed description and its scope will be pointed out in the appended claims.

DESCRIPTION OF THE PREFERRED EMBODIMENT

Figure 1:
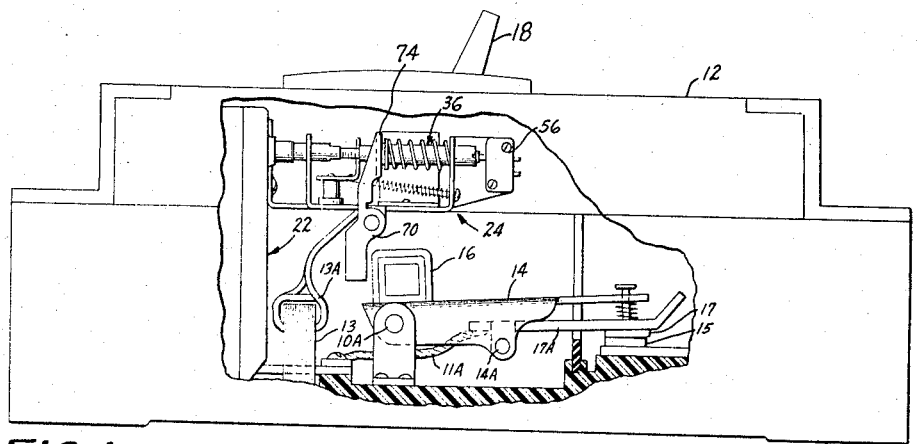
FIGURE 1 is a side elevational view of a circuit breaker constructed in accordance with the invention, the case being partially broken away to reveal internal construction.

Referring now in detail to the attached drawings, the invention is shown in FIGURE 1 as incorporated in an electrical circuit breaker having a generally rectangular insulating casing comprising a base 10 and a cover 12. A pair of relatively movable contacts 15 and 17 are supported in the base 10 and comprise a stationary contact 15 connected to a suitable incoming or "line" terminal (not shown) mounted on the base 10, and a movable contact 17 connected to a suitable outgoing or "load" terminal (not shown) on base 10. The movable contact 17 is carried by an arm 17A pivotally mounted by a pivot pin 14A on a contact arm. The contact arm 14 is pivotally supported in the base 10 by a pivot pin 10A and is rigidly joined to a contact cross arm 16. The arm 17A is connected to the load terminal by means including flexible connector 11A.

The circuit breaker illustrated is a three-pole circuit breaker with three elongated chambers or current paths or "poles," each of which contains current carrying parts and contacts similar to those described hereinbelow. An operating mechanism (not shown) is mounted in the base 10 within one of the chambers, and is operable by means of manually operable handle member 18 for operating the contact cross arm 16 and the associated contact arms 14 between open and closed positions. The operating mechanism referred to includes a normally restrained but releasable member (not shown) which, when released, causes automatic opening of the contacts of all poles. The releasable member is arranged to be released by predetermined amount of movement of a trip member or trip "bar" 20. The trip bar 20 is pivotally mounted on a pivot pin or support 20A within an inner enclosure 22A of the trip unit 22. Both thermal means and magnetic means are provided in accordance with the present invention to effect the releasing movement of the trip member 20 upon the occurrence of predetermined current conditions. The thermal and magnetic tripping means will be described in brief below and are similar to those shown and more fully described in United States Patent Number 3,162,739 granted Dec. 22, 1964 to Klein and Powell and assigned to the same assignee as the present invention.

For the purpose of initiating a tripping operation upon the occurrence of a ground fault in a circuit to be protected, ground fault responsive tripping means is also provided and is designated generally by the numeral 24.

Figure 5:
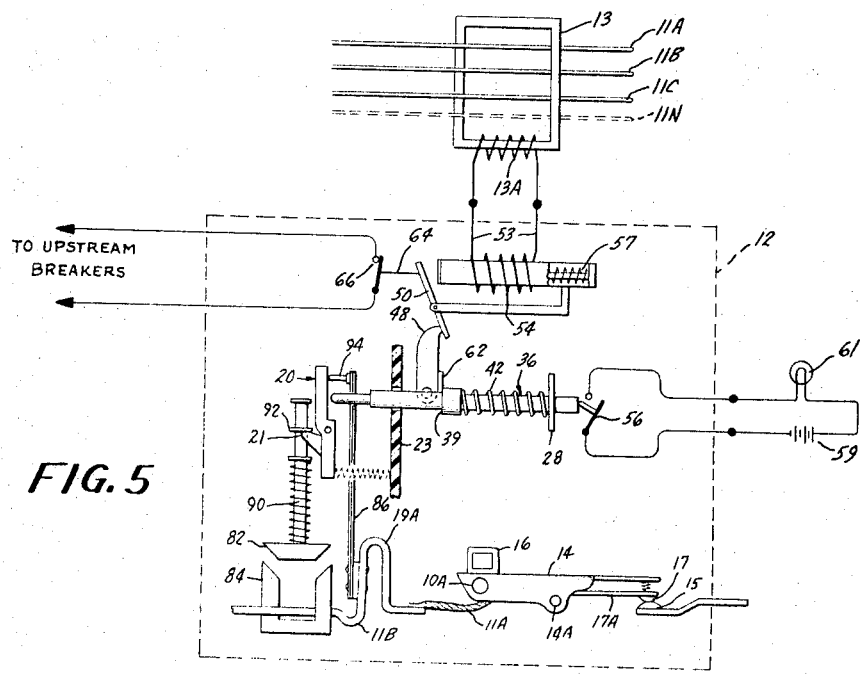
FIGURE 5 is a partly schematic, partly representational illustration of the circuit breaker of FIGURE 1, certain parts being shown distorted in size or position for clarity of illustration.

The ground fault current responsive tripping means 24 includes ground fault sensing means comprising, as shown in FIGURE 1 and FIGURE 5, a toriod type current transformer 13 mounted in the circuit breaker base 10 by suitable means, not shown, which embraces system conductors 11A, 11B, and 11C (and optional neutral conductor 11N if used). A secondary coil 13A is provided on the coil 13. The coil 13 derives an electrical signal dependent on an unbalance condition of current in the conductors 11A, 11B, 11C caused by the flow of ground fault current. Under normal conditions, the currents in all of the poles of the breaker sum to zero and thus there is no net magnetic flux in the core and therefore no current flow in the transformer secondary 13A. Upon the occurrence of a ground fault, the currents in the poles no longer sum to zero and thus there is a resultant net flux in the core and consequent current flow in transformer secondary 13A. The output of transformer secondary 13A is connected to current coil 54 so that current flowing in the transformer secondary 13A, because of a fault, energized the coil 54 to set in motion the tripping mechanism described below.

Figure 3:
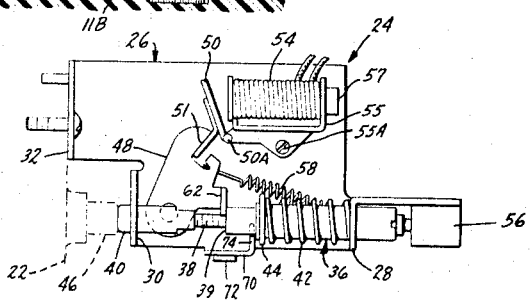
FIGURE 3 is a top plan view of the ground fault responsive tripping device of the circuit breaker of FIGURE 1 on enlarged scale, showing the device in the "ON" or latched position.
Figure 4:
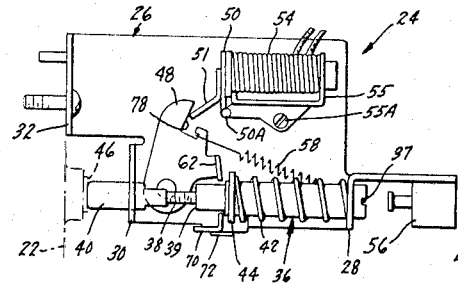
FIGURE 4 is a view similar to FIGURE 3 with the parts shown in the "tripped" position.

Referring particularly to FIGURES 3 and 4, the ground fault responsive tripping device 24 comprises a generally flat sheet metal support frame, generally designated by the numeral 26, having bent up wall portions 28, 30 and 32. A coil support 55 is mounted on the frame 26 by suitable means such as by screws 55A and carries a coil 54. An actuating armature 50 (see FIGS. 3 and 4) is pivotally mounted on a pivot support 50A on support 55, and is provided with an engaging portion 51.

A tripping plunger, generally designated by the numeral 36 is slidably supported in suitable apertures (not shown) of the side wall portions 28 and 30. The tripping plunger 36 is adjustable in length by means of a threaded portion 38 of reduced cross section which is threadably received within the trip engaging portion 40. The reduced cross section of the threaded portion 38 provides a shoulder portion 39 on the tripping plunger 36 for a purpose to be described hereinafter. To provide easy screwdriver-type adjustment, a slot 37 is provided in one end of the tripping plunger 36. Thus, the tripping plunger 36 is adjustable in length to obtain proper and effective engagement with the trip unit 22.

A compression spring 42 surrounds the tripping plunger 36 between the side wall portion 28 and a washer 44 rigidly carried by the plunger 36 and biases the tripping plunger 36 towards the trip unit 22. The trip engaging portion 40 of the plunger 36 extends through side wall 30 and engages a spring biased tripping rod 46 slidably supported in an aperture 45 in the wall of the trip unit 22. The tripping rod 46 is biased towards the trip engaging portion 40 by spring 47 and extends through the wall 23 of the trip unit 22 to engage the trip member 20 when acted on by the plunger 36, to trip the circuit breaker.

For the purpose of normally releasably holding the tripping plunger 36 against movement to the left under the bias of compression spring 42, a latch member 48 is provided which is pivotally supported on a reduced end portion of the post 52 on the frame 26. One end of the latch member 48 engages a portion 51 of actuating armature 50. Portion 51 of the armature 50 extends into a notch 78 in latch member 48 so that clockwise pivoting of actuating armature 50 causes counterclockwise pivoting of latch member 48. The latch member 48 is constantly biased for rotation in a clockwise direction as illustrated in FIGURE 3 by the action of tension spring 58 one end of which is mounted in the notch 78 of latch member 48 and the other end of which is affixed to the side wall portion 28. A screw 60 (see FIG. 2) having the same pitch as the spring 58 passes through an aperture (not shown) in the side wall portion 28 of the frame 26 and threads internally into the spring 58. The tension or biasing force on the latch member 48 may be adjusted by turning the screw 60 whereby a portion of the spring may be released or taken up by the threaded shank of the screw 60. The force required of the coil 54 to cause release of the latch member 48 may be adjusted by adjusting the force of the spring 58.

The tripping plunger 36 is held in the latched position against the bias of the compression spring 42 by a latch portion 62 of the latch member 48 which normally engages the shoulder portion 39 on tripping plunger 36. When the current coil 54 is without current, and the armature 50 is in its unattracted position, as shown in FIGURE 3, spring 58 holds the latch member 48 in the latched position, and leg 62 engages the shoulder portion 39 of the tripping plunger so that the trip engaging portion 40 is restrained from engaging tripping rod 46 of the trip unit 22. When current coil 54 is energized by current from fault sensing transformer 13, armature 50 is pivoted by the magnetic force set up by coil 54. Pivoting of the armature 50 causes the latch 48 to rotate against the force of tension spring so that leg portion 62 is moved from engagement with shoulder 39 and tripping plunger 36 is moved into engagement with tripping rod 46 which in turn engages trip member 20, thereby tripping the circuit breaker.

In order to reset the fault current responsive tripping device 24, a resetting lever 70 is mounted on a bracket 71 of the frame 26 by means of a pivot pin 72, and extends generally normally to tripping plunger 36. A leg portion 74 of the resetting lever 70 engages the shoulder portion 44 on the tripping plunger 36. The fault current responsive tripping device 24 is reset from the tripped position shown in FIGURE 4 to the latched position shown in FIGURE 3 by rotating the resetting lever 70 in a clockwise direction as viewed in FIGURE 2 so that the lever leg portion 74 engages the plunger shoulder portion 44 and moves the tripping plunger 36 to the latched position. Such rotation of lever 70 is automatically provided by the engagement of a portion of the crossarm 16 with the lower end 70' of the lever 70 as shown in dotted lines in FIGURE 2. The tension spring 58 biases the latch member 48 into the latched position. Where the fault has been cleared and thus there is no current through coil 54 the latch member 48 is retained in the latched position by engagement of leg portion 62 thereof with plunger shoulder portion 44.

The operation of the ground fault responsive device 24, part of which has been outlined above, is as follows:

In FIGURES 1, 3 and 5 the parts of device 24 are shown in the position which they occupy during normal operation of the circuit breaker. In this position, the tripping plunger 36 is held in a retracted position, the latch member 48 being held in the latched position by the bias of spring 58. Leg portion 62 of latch member 48 engages shoulder 39 of the tripping plunger 36, whereby restraining the tripping plunger from movement inwardly toward the trip unit 22.

Upon the occurrence of a ground fault, fault current coil 54 is energized by current flowing from fault sensing current transformer 13. When the coil 54 is energized, armature 50 together with its abutting portion 51 is pivoted from its outward position to its closed position shown in FIGURE 4. The pivoting movement of abutting element 51 causes latch member 48 to likewise pivot thereby disengaging leg portion 62 from plunger shoulder 39, which permits tripping plunger 36 to be moved inwardly by compression spring 42 to engage the tripping rod 46 which moves inwardly against the bias spring 47 and actuates circuit breaker trip member 20.

Figure 2:
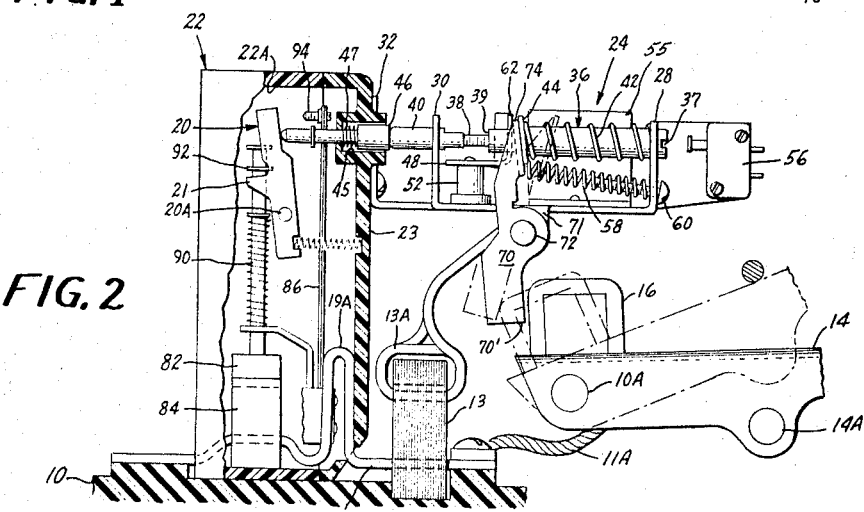
FIGURE 2 is an elevational view on enlarged scale of a portion of the circuit breaker of FIGURE 1 showing particularly the ground fault responsive tripping device and the overcurrent and short circuit tripping devices.

The magnetic and thermal control means for trip 20 are best shown in FIGURE 2. The magnetic control means, responsive to short circuiting, consists, in brief, of a U-shaped magnet 84, (see FIG. 5) which surrounds conductor 11B, electrically in series with conductor 11A and the movable contact 17. A movable armature 82 is positioned at the top of the U of magnet 84 to complete the magnetic circuit. A tripping rod 90 extends perpendicularly from movable armature 82 and includes a shoulder portion 92 which engages an arm 21 of trip member 20. Duplicate magnetic control means are similarly positioned with respect to the other system conductors. In operation, upon the occurrence of short-circuit magnitude currents in conductor 11A movable armature 82 is attracted to magnet 84, thereby causing movement of tripping rod 90 and its associated shoulder portion 92. Movement of shoulder portion 92, in turn, causes movement of arm member 21 of tripping member 20 which produces rotation of member 20 about pivot point 20A. This rotation releases an intermediate latching mechanism (not shown) to open the breaker. The intermediate latching mechanism may be of the type shown and described in the United States Patent Number 3,205,325, granted Sept. 7, 1965 to Archer, Klein and Stokes and assigned to the same assignee as the present invention.

The thermal tripping control, responsive to overcurrents consists, in brief, of a bimetallic strip 86 located in the trip unit 22 substantially parallel to wall portion 23 and affixed to a generally U-shaped intermediate portion 19A of conductor 11A. The bimetallic strip 86 is also provided, at one end thereof, with an adjustable contact screw 94. Again, the thermal control is duplicated for the other "poles" of the breaker. In operation, passage of current through the conductors 11A causes the intermediate portion 19A to become heated. Due to its reduced cross section heat generated in the portion 19A is transmitted, primarily by conduction, to the bimetallic strip 86 which is disposed and arranged to deflect to the left, as viewed in the FIGURES 2 and 5, upon heating. Deflection of the strip 86 causes the contacting screw 94 to engage the tripping element 20, rotating the tripping element counterclockwise as viewed. Such rotation of the trip element causes unlatching of the intermediate latching mechanism referred to above (not shown) to open the breaker.

The relay formed by fault current core 54 and pivotable armature 50 is supplied with time delay means 57, shown in FIGURES 3-5, so that in cases where ground faults draw currents of magnitudes which fall into the range protected by the thermal or magnetic tripping means, these latter means have a chance to act before fault current responsive tripping mechanism 24 acts. In this way duplicative tripping is prevented. The time delay itself is structurally conventional. Also as is explained below the time delay may be used to give other circuit breakers in the system a chance to act.

The fault current responsive tripping device 24 may also include means for preventing circuit breakers closer to the source of energy. i.e., "upstream," from tripping when device 24 trips. The purpose of such means is to prevent the unnecessary tripping of upstream breakers because of a local ground fault and thus prevent the power from being shut off from locations where it could be safely distributed. As shown in FIGURE 5, such a device comprises a connector 64 connected to contacts 66 and actuated by armature 50. Movement of armature 50 from its outwardly position to its closed position with respect to current coil 54 causes control element 64 to open contacts 66. The switch formed by contacts 66 is connected in series with the sensing circuit of a circuit breaker or breakers (not shown), having similar ground fault responsive protection, located upstream from breaker 22. Thus when a ground fault exists in part of the system sensed by transformer 13, means 64, 66 of FIGURE 5 cause disconnection of selected upstream breakers by open circuiting their sensing circuits upon movement of armature 50 of ground fault responsive tripping device 24.

Figure 8:
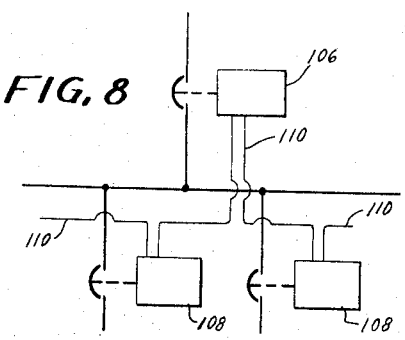
FIGURE 8 is a schematic diagram of a distribution system wherein the present invention is used.

The time delay means 67 and the breaker trip prevention means 64, 66 may be used advantageously in an overall system such as that shown in FIGURE 8 by providing the feeder breakers 108 with breaker trip prevention means connected in series with the sensing circuit of the main breaker 106 by control circuit 110. The feeder breakers 108 act sooner than the main breaker 106 since they are set to operate at a lower value of current.

Ground fault responsive tripping means 24 is also provided with remote indicating means 61 (FIGURE 5) to warn personnel of the existence of a fault. Normally closed switch 56 is held in an open position by the abutting action of tripping plunger 36 against switch element 56. Thus when tripping plunger 36 moves to its tripped position, switch 56 closes and completes a lighting circuit including battery 59 and light 61. It will be understood that the remote indicating means can take other forms, i.e., that light 61 could be replaced by a bell or that both a bell and light could be used.

It will be appreciated that the sensing transformer 13 of FIGURE 5 could be used with conductor arrangements other than the three wire polyphase system (or the four wire system with a neutral conductor shown in the figure). For example, such conductor arrangements as a single phase three wire system where one wire is a neutral, a double phase wire system or a double phase five wire system could be sensed.

Figure 6:
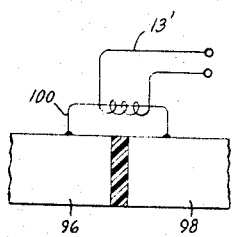
FIGURES 6 and 7 are schematic diagrams of fault current sensing arrangements alternative to that shown in FIGURE 5.
Figure 7:
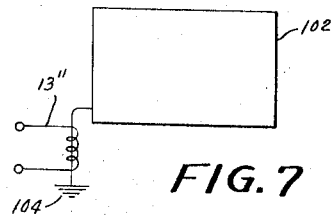

In FIGURES 6 and 7 current transformer sensing means used detecting grounds occurring in other locations in the system are shown. In FIGURE 6, current transformer 13' embraces a connection 100 between elements 96 and 98 of an insulated joint of a busway housing. In FIGURE 7, current transformer 13" embraces a ground connection 104 from a switchboard housing 102 which is otherwise insulated from ground. In both FIGURES 6 and 7, there should be no current flow in the connections 100 and 104 under normal conditions. When, however, there is a failure of insulation between conductors in the busway and the busway housing 96 or between the conductors in the switchboard and the switchboard housing 102, the respective transformer 13', 13" senses the current flowing in these connections and causes the circuit breaker to trip.

While I have disclosed only certain embodiments of the invention, it will be readily appreciated that many modifications thereof may be made. I, therefore, intend by the appended claims to cover all such modifications as fall within the true spirit and scope of the invention.

What I claim as new and desire to secure by Letters Patent of the United States is:

1. An electric circuit breaker comprising:
   (a) an enclosure of insulating material;
   (b) at least one pair of separable contacts supported in said enclosure;
   (c) manually operating mechanism supported in said enclosure and connected to said contacts said operating mechanism including a manually operable handle member projecting from said enclosure and movable between "ON" and "OFF" positions to move said contacts between corresponding open and closed circuit positions;
   (d) automatically operable means supported in said enclosure for causing movement of said contacts from said closed to said open circuit position irrespective of the maintenance of said manually operable handle in said ON position;
   (e) first current responsive means in said enclosure responsive to current passing through said contacts;
   (f) a first pair of line and load terminals supported by said enclosure, first conductor means connecting said separable contacts and said current responsive means electrically in series between said first pair of line and load terminals to form part of an "outgoing" electrical line conducting power from an electrical source to an electrical load;
   (g) a second pair of line and load terminals supported by said enclosure;
   (h) second conductor means interconnecting said second pair of line and load terminals to form part of a "return" line from said load to said power source, whereby current flowing in said second conductor means is normally equal and opposite to current flowing in said first conductor means;
   (i) electrical signal generating means supported in said enclosure for generating an electric signal upon the occurrence of unbalance in currents in said first and second conductors;
   (j) second current responsive means supported in said enclosure and actuated upon the occurrence of a signal from said electric signal generating means for causing actuation of said automatically operable means and opening of said contacts;
   (k) said signal generating means comprising electromagnetic means including a toroid type electro-magnetic core said first and second conductor means passing through said core, and a secondary winding carried by said core for generating said electric signal.

2. An electric circuit breaker comprising:
   (a) an enclosure of insulating material;
   (b) at least one pair of separable contacts supported in said enclosure;
   (c) manually operating mechanism supported in said enclosure and connected to said contacts said operating mechanism including a manually operable handle member projecting from said enclosure and movable between "ON" and "OFF" positions to move said contacts between corresponding open and closed circuit positions;
   (d) automatically operable means supported in said enclosure for causing movement of said contacts from said closed to said open circuit position irrespective of the maintenance of said manually operable handle in said ON position;
   (e) first current responsive means in said enclosure responsive to current passing through said contacts;
   (f) a first pair of line and load terminals supported by said enclosure, first conductor means connecting said separable contacts and said current responsive means electrically in series between said first pair of line and load terminals to form part of an "outgoing" electrical line conducting power from an electrical source to an electrical load;
   (g) a second pair of line and load terminals supported by said enclosure;
   (h) second conductor means interconnecting said second pair of line and load terminals to form part of a "return" line from said load to said power source, whereby current flowing in said second conductor means is normally equal and opposite to current flowing in said first conductor means;
   (i) electric signal generating means supported in said enclosure for generating an electric signal upon the occurrence of unbalance in currents in said first and second conductors;
   (j) second current responsive means supported in said enclosure and actuated upon the occurrence of a signal from said electric signal generating means for causing actuation of said automatically operable means and opening of said contacts;
   (k) said circuit breaker also comprising a multipole circuit breaker having a separate chamber for each pole, there being a first and second pair of line and load terminals for each of said poles, said multipole circuit breaker having a single magnetic core and all of said outgoing and return conductors of all of said poles passing through said core, and a single secondary winding on said core connected to said trip actuation device.

3. An electric circuit breaker comprising:
   (a) an enclosure of insulating material;
   (b) at least one pair of separable contacts supported in said enclosure;
   (c) manually operating mechanism supported in said enclosure and connected to said contacts said operating mechanism including a manually operable handle member projecting from said enclosure and movable between "ON" and "OFF" positions to move said contacts between corresponding open and closed circuit positions;
   (d) automatically operable means supported in said enclosure for causing movement of said contacts from said closed to said open circuit position irrespective of the maintenance of said manually operable handle in said ON position;
   (e) first current responsive means in said enclosure responsive to current passing through said contacts;
   (f) a first pair of line and load terminals supported by said enclosure, first conductor means connecting said separable contacts and said current responsive means electrically in series between said first pair of line and load terminals to form part of an "outgoing" electrical line conducting power from an electrical source to an electrical load;
   (g) a second pair of line and load terminals supported by said enclosure;
   (h) second conductor means interconnecting said second pair of line and load terminals to form part of a "return" line from said load to said power source, whereby current flowing in said second conductor means is normally equal and opposite to current flowing in said first conductor means;
   (i) electric signal generating means supported in said enclosure for generating an electric signal upon the occurrence of unbalance in currents in said first and second conductors;

(j) second current responsive means supported in said enclosure and actuated upon the occurrence of a signal from said electric signal generating means for causing actuation of said automatically operable means and opening of said contacts;

(k) said actuating means including time delay means for delaying actuation of said automatic operating mechanism a predetermined time after occurrence of said signal.

4. An electric circuit breaker comprising:
(a) an enclosure of insulating material;
(b) at least one pair of separable contacts supported in said enclosure;
(c) manually operating mechanism supported in said enclosure and connected to said contacts said operating mechanism including a manually operable handle member projecting from said enclosure and movable between "ON" and "OFF" positions to move said contacts between corresponding open and closed circuit positions;
(d) automatically operable means supported in said enclosure for causing movement of said contacts from said closed to said open circuit position irrespective of the maintenance of said manually operable handle in said ON position;
(e) first current responsive means in said enclosure responsive to current passing through said contacts;
(f) a first pair of line and load terminals supported by said enclosure, first conductor means connecting said separable contacts and said current responsive means electrically in series between said first pair of line and load terminals to form part of an "outgoing" electrical line conducting power from an electrical source to an electrical load;
(g) a second pair of line and load terminals supported by said enclosure;
(h) second conductor means interconnecting said second pair of line and load terminals to form part of a "return" line from said load to said power source, whereby current flowing in said second conductor means is normally equal and opposite to current flowing in said first conductor means;
(i) electric signal generating means supported in said enclosure for generating an electric signal upon the occurrence of unbalance in currents in said first and second conductors;
(j) second current responsive means supported in said enclosure and actuated upon the occurrence of a signal from said electric signal generating means for causing actuation of said automatically operable means and opening of said contacts;
(k) said circuit breaker also including means interconnecting said actuating means and said automatic operating mechanism comprising a normally latched member supported in said casing and means biasing said normally latched member toward engagement with said trip member, latch means normally restraining said latched member from operative movement, an armature movable in response to current in said actuating means and means connecting said armature to said latch means to cause movement of said latch means in releasing direction in response to movement of said armature upon the occurrence of said signal from said electromagnetic means.

5. An electric circuit breaker comprising:
(a) an enclosure of insulating material;
(b) at least one pair of separable contacts supported in said enclosure;
(c) manually operating mechanism supported in said enclosure and connected to said contacts said operating mechanism including a manually operable handle member projecting from said enclosure and movable between "ON" and "OFF" positions to move said contacts between corresponding open and closed circuit positions;
(d) automatically operable means supported in said enclosure for causing movement of said contacts from said closed to said open circuit position irrespective of the maintenance of said manually operable handle in said ON position;
(e) first current responsive means in said enclosure responsive to current passing through said contacts;
(f) a first pair of line and load terminals supported by said enclosure, first conductor means connecting said separable contacts and said current responsive means electrically in series between said first pair of line and load terminals to form part of an "outgoing" electrical line conducting power from an electrical source to an electrical load;
(g) a second pair of line and load terminals supported by said enclosure;
(h) second conductor means interconnecting said second pair of line and load terminals to form part of a "return" line from said load to said power source, whereby current flowing in said second conductor means is normally equal and opposite to current flowing in said first conductor means;
(i) electric signal generating means supported in said enclosure for generating an electric signal upon the occurrence of unbalance in currents in said first and second conductors;
(j) second current responsive means supported in said enclosure and actuated upon the occurrence of a signal from said electric signal generating means for causing actuation of said automatically operable means and opening of said contacts;
(k) said actuating means also including normally closed switch means for connection to actuating means of other circuit breakers and means for operating said contacts in response to operation of said actuating means to open said contacts and temporarily disable said actuating means of said other circuit breakers.

6. An electric circuit breaker comprising:
(a) an enclosure of insulating material;
(b) at least one pair of separable contacts supported in said enclosure;
(c) manually operating mechanism supported in said enclosure and connected to said contacts said operating mechanism including a manually operable handle member projecting from said enclosure and movable between "ON" and "OFF" positions to move said contacts between corresponding open and closed circuit positions;
(d) automatically operable means supported in said enclosure for causing movement of said contacts from said closed to said open circuit position irrespective of the maintenance of said manually operable handle in said ON position;
(e) first current responsive means in said enclosure responsive to current passing through said contacts;
(f) a first pair of line and load terminals supported by said enclosure, first conductor means connecting said separable contacts and said current responsive means electrically in series between said first pair of line and load terminals to form part of an "outgoing" electrical line conducting power from an electrical source to an electrical load;
(g) a second pair of line and load terminals supported by said enclosure;
(h) second conductor means interconnecting said second pair of line and load terminals to form part of a "return" line from said load to said power source, whereby current flowing in said second conductor means is normally equal and opposite to current flowing in said first conductor means;
(i) electric signal generating means supported in said enclosure for generating an electric signal upon the occurrence of unbalance in currents in said first and second conductors;

(j) second current responsive means supported in said enclosure and actuated upon the occurrence of a signal from said electric signal generating means for causing actuation of said automatically operable means and opening of said contacts;

(k) said circuit breaker also comprising indicating means visible externally of said enclosure for indicating the actuated condition of said actuating means due to said occurrence of unbalance in said currents of said first and second conductors.

References Cited

UNITED STATES PATENTS

| | | | |
|---|---|---|---|
| 1,285,625 | 11/1918 | Cline | 317—54 |
| 3,259,802 | 7/1966 | Steen | 317—18 |
| 3,278,708 | 10/1966 | Casey | 335—35 |

BERNARD A. GILHEANY, *Primary Examiner.*

H. BROOME, *Assistant Examiner.*

U.S. Cl. X.R.

335—35